United States Patent [19]

McNamara

[11] Patent Number: 5,336,835
[45] Date of Patent: Aug. 9, 1994

[54] PRODUCT/PROCESS/APPLICATION FOR REMOVAL OF MERCURY FROM LIQUID HYDROCARBON

[75] Inventor: James D. McNamara, Crafton, Pa.

[73] Assignee: Calgon Carbon Corporation, Pittsburgh, Pa.

[21] Appl. No.: 892,080

[22] Filed: Jun. 2, 1992

Related U.S. Application Data

[62] Division of Ser. No. 441,034, Nov. 22, 1989, abandoned.

[51] Int. Cl.$^5$ ................................................ C07C 7/12
[52] U.S. Cl. ................................ 585/820; 585/849; 585/852; 585/853; 502/417
[58] Field of Search ............... 585/849, 852, 853, 855, 585/833, 820, 823; 502/417

[56] References Cited

U.S. PATENT DOCUMENTS

| | | | |
|---|---|---|---|
| 2,368,261 | 1/1945 | Neef, Jr. | 196/39 |
| 2,392,846 | 1/1946 | Friedman | 196/44 |
| 3,793,185 | 2/1974 | Whitehurst et al. | 208/251 R |
| 4,708,853 | 11/1987 | Matviya et al. | 502/417 |
| 4,709,118 | 11/1987 | Yan | 585/820 |
| 4,946,582 | 8/1990 | Torihata et al. | 208/251 R |
| 4,985,389 | 1/1991 | Audeh | 502/516 |
| 4,986,898 | 1/1991 | Torihata et al. | 208/251 R |

*Primary Examiner*—Anthony McFarlane
*Attorney, Agent, or Firm*—Cindrich & Titus

[57] ABSTRACT

Impregnated carbon adsorbents for the removal of mercury from liquid hydrocarbons are used in a variety of applications. The activated carbon impregnated adsorbents in the present invention remain effective in removing mercury. Generally, these activated carbons are comprised of an activated carbon adsorbent impregnated with a composition containing metal halide or other reducing halide, supplemented according to the desired characteristics with other elements. The formulation of the impregnants in the present invention can be varied to adjust the performance characteristics so as to meet the desired mercury removal performance criteria, to achieve enhanced removal of organic bound mercury from liquid hydrocarbon, and to have other advantages useful in a variety of applications. These impregnated carbon adsorbents possess desirable qualities regarding their ability to remove even trace levels of mercury from liquid hydrocarbon without a leaching effect of the impregnants used.

7 Claims, No Drawings

PRODUCT/PROCESS/APPLICATION FOR REMOVAL OF MERCURY FROM LIQUID HYDROCARBON

CROSS REFERENCE TO RELATED APPLICATION

This is a divisional application of copending application Ser. No. 07/441,034, filed Nov. 22, 1989, now abandoned entitled "Novel Product/Process/Application For Removal Of Mercury From Liquid Hydrocarbon."

FIELD OF THE INVENTION

The present invention relates to impregnated carbon adsorbents for removal of mercury from liquid hydrocarbon.

BACKGROUND OF THE INVENTION

Activated carbon has long been used to remove mercury from a stream of liquid and/or gas hydrocarbon. These carbons are useful in a variety of industrial applications and often involve the use of special impregnants to remove mercury that would not otherwise be removed through the use of base carbons. Impregnated activated carbons, as well as formulations of silica, aluminumna and other materials, have been known and used for many years largely for removal of elemental mercury in gas phase and aqueous applications. However, due to the chemical state of the mercury present in liquid hydrocarbons, these formulations have limited effectiveness in removing mercury in non-aqueous liquid applications.

U.S. Pat. No. 4,709,118 (Mobil Oil Corp.) teaches mercury removal from liquid hydrocarbon by incorporating elemental Bismuth or Tin or a mixture of these into a Silica, Alumina, or other non-reactive substrate including activated carbon. U.S. Pat. No. 4,474,896 to C. C. Chao relates to polysulfide containing adsorbent compositions for removal of elemental mercury from gas or liquid streams.

U.S. Pat. Nos. 4,338,288 to Rollman, French Patent No. 2529802 to Pelosi, et al. and U.S. Pat. No. 4,094,777 to La Villa et al. involve the removal of mercury and/or heavy metals from gas and liquid medium using a variety of sulfur containing sorbents to include manganese nodule particles containing occluded sulfur, alumina and silicate type support media containing elemental sulfur or copper sulfide.

Japanese Patent No. 51003386 describes the use of activated carbon containing a hydrogen halide salt of a compound having one or more functional groups, while U.S. Pat. No. 4,654,322 involves the use of a cysteine residue fixed to any insoluble carrier. Other references disclose removal of mercury by amalgamation, including U.S. Pat. No. 3,374,608 to Manes, U.S. Pat. No. 4,353,741 to Capuano, et al., Japanese Patent No. 62155926 to Miyoshi and French Patent No. 2310795 to Inst. Francais du Petrole.

The greatest number of references relating to the removal of mercury vapor specifically from gas streams involved the use of halogens. Japanese Patents No. 49066592 to Sumitomo Chemical Co. discloses an activated carbon carrying one or more chlorides of Li, Na, K, Mg, Ba, Zn, Al, Sn, Mn, Fe, Co, Ni, and $NH^4$. Similarly, Swiss Patent No. 1163982 to Belozerov, et al. describes a process for removal of mercury vapor from air containing dusts and aerosols by passage through activated carbon followed by treatment with activated carbon impregnated with monochloroiodide.

Japanese Patent Nos. 49053590, 49053593, 49053592 and 49053591 to Nippon Soda Co. LTD. claim the use of activated carbons containing halides for removal of mercury from gases. In Patent No. 49053590, the use of activated carbons containing halides of Group III-VIII metals provides excellent adsorptive capacity for Patent No. 49053593 specifies the use of chlorides of Group I metals impregnated on activated carbons and Patent Nos. 49053592 and 49053591 specify similar iodide and bromide compounds, respectively. Other patents describe the use of hydrogen halide and ferric chloride, respectively, impregnated on activated carbon for removal of mercury vapor from gas streams, while references describe the use of metal salts, metals in combination with sulfur or silver and mineral acids.

U.S. Pat. No. 4,708,853 to Calgon Carbon describes the use of sulfur impregnated molecular sieve activated carbon for removal of mercury from natural gas. An independent study on gas separation purification (Henning et al.) evaluated the mercury removal performance of impregnated activated carbons. The carbons studied include the following impregnates: Potassium Iodide, Sulfuric Acid, Sulfuric acid/Potassium Iodide, Sulphur, and Sulphur/Potassium Iodide. The sulphur impregnations were found to be most effective for mercury removal from gas streams.

U.S. Pat. No. 4,094,098 relates to the removal of mercury vapor via a process which involves the addition of hydrogen sulfide gas and amines into the natural gas stream effecting precipitation of mercury as the sulfide while the amines absorb the excess hydrogen sulfide.

Other references disclose mercury removal from aqueous systems, by chemical addition and by physical separation. Other references involving technology not related to mercury removal applications include the use of mercury or mercury compounds in manufacturing processes, safe handling and disposal of mercury removal adsorbent materials and decontamination of equipment, elimination of interferences due to mercury or mercury compounds present in industrial processes and analytical techniques utilizing and evaluating mercury containing compounds.

It is an objective of the present invention to provide an adsorbent which is effective in removing mercury from liquid hydrocarbons, and, in particular, effective in removing even trace levels of mercury through the impregnation of the activated carbon adsorbent with reactant/reducing agents. It is a further objective of the invention to provide a carbon adsorbent for use in a variety of non-aqueous industrial and other mercury removal applications.

SUMMARY OF THE INVENTION

The present invention embodies an impregnated carbon adsorbent that removes mercury from liquid hydrocarbons by conversion of organo-mercury compounds to inorganic mercury halides and/or the reduction of non-elemental mercury compounds to elemental mercury. Once converted to a more adsorbable form, physical adsorption and/or chemisorption, to include further reaction with amalgamating impregnants may occur.

In one embodiment, enhanced mercury removal capability is achieved by the impregnation of activated carbon with at least one metal halide consisting of the halides of I, Br and Cl. The metal I, Br and Cl halides in this embodiment of the present invention facilitate the mercury conversion and removal process; as such, although the metals from Groups I and II of the periodic table are preferred, any metal from the periodic table of the elements can serve as the "vehicle" for the depositing and/or maintaining the I, Br and Cl halides on the carbon surface.

The use of one or more of these impregnants on activated carbon efficiently converts organo-mercury and weakly adsorbable compounds present in liquid hydrocarbon to the desired inorganic mercury halides, after which adsorption of that mercury can efficiently occur.

Generally, the present invention comprises an activated carbon adsorbent impregnated to contain, depending on the particular characteristics desired, a final composition by weight of containing a mixture from 0.5% to 25% metal halide. Poor mercury removal efficiency (shown in Table 1) is most likely due to the nature of the mercury species present in the liquid hydrocarbon. (Mercury in an organic form is difficult to adsorb.)

Activated carbon can also be usefully impregnated with reducing agents comprising at least one impregnant of the metal cations of $Sn^{+2}$, $Ti^{+2}$ and/or Cu, each of which will act to efficiently convert organic mercury and organic mercury salts to elemental mercury for physical adsorption, in that each of these cations have sufficient reduction capability so as to facilitate this conversion. Chemisorption of the mercury with amalgamating impregnants such as Ag, Sn, Zn, Al, Au, Cu and alkali elements from the periodic table of elements is also useful in that these known amalgamating elements in the context of the present invention "fix" the mercury to the surface of the carbon enhancing the strength of adsorption and is not dependent on equilibrium forces.

Specific embodiments of the present invention comprise an activated carbon adsorbent impregnated so as to result in a composition comprising by weight from 1% to 25% of $Sn^{+2}$. As set forth above, these activated carbons may also optionally be comprised of by weight from 1% to 15% Ag, Sn, Zn, Al, Au, Cu and/or alkali elements, which function as amalgamating or reactive agents.

Uses for the present invention include the treatment of liquid hydrocarbon prior to olefin production, liquid propane gas and liquid natural gas processing, or similar operations. Other applications include the prevention of mercury poisoning of precious metal catalysts and the prevention of metal embrittlement damage to piping and equipment, as well as any other situation in which high and in particular, low-level concentrations of mercury are to be removed from liquid hydrocarbon.

The advantages of the present invention over other ways of removing mercury include that it permits mercury removal from hydrocarbon via the novel concept of the impregnating compounds in activated carbon so that the impregnants perform as reactant or reducing agents. In this sense the activated carbon may selectively adsorb efficient levels of mercury that would otherwise escape less effective mercury removal systems. As a result of the reactant-impregnated carbon's ability in the present invention to convert mercury to more readily adsorbable forms, these carbons perform their mercury removal function in a manner not previously contemplated, and in a manner that significantly increases the capacity of filters using these carbons in removing trace levels of mercury that is not possible through the use of other activated carbons.

PRESENTLY PREFERRED EMBODIMENTS

Initial Carbon Screening Tests

A variety of impregnated and non-impregnated carbons have been tested to determine their effectiveness for removing mercury from liquid hydrocarbon. The carbons differed in types of impregnants, pore structure and activity as well as source of raw material. The carbons tested included coconut based carbon (PCB), high activity coal-based carbon (BPL and Filtrasorb 400), medium activity coal-based carbon (CWS), BPL carbon impregnated with (by weight) 1% Ag, CWS carbon impregnated with 4% Ag, as well as a coal based surface modified carbon having a highly reactive surface (CAT). Additional impregnated carbons currently used in a variety of applications included other impregnated coal-based carbon formulations. The results of the initial tests presented in Table I reveal the poor mercury adsorptive capacity of these carbons in comparison to the impregnated carbons tested in the Tables that follow.

TABLE I

| | INITIAL ISOTHERM TEST RESULTS FOR REMOVAL OF MERCURY FROM LIQUID HYDROCARBON | | | | |
|---|---|---|---|---|---|
| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
| BPL 12 × 30 | CB/NI | 1.0 | 8 | 3.22 | 80.0 |
| | | 5.0 | 5 | 0.70 | 87.5 |
| | | 10.0 | 4 | 0.36 | 90.0 |
| PCB 12 × 30 | CNB/NI | 1.0 | 22 | 1.85 | 45.0 |
| | | 5.0 | 8 | 0.64 | 80.0 |
| | | 10.0 | 14 | 0.25 | 65.0 |
| CWS 12 × 30 | CB/NI | 1.0 | 5 | 3.58 | 87.5 |
| | | 5.0 | 8 | 0.64 | 80.0 |
| | | 10.0 | <3 | >0.37 | >92.5 |
| BPL 12 × 30 | CB/1% SILVER | 1.0 | 14 | 2.62 | 65.0 |
| | | 5.0 | 4 | 0.73 | 90.0 |
| | | 10.0 | 8 | 0.32 | 80.0 |
| CWS 12 × 30 | CB/4% SILVER | 1.0 | 8 | 6.53 | 80.0 |
| | | 5.0 | 15 | 2.47 | 62.5 |
| | | 10.0 | 3 | 0.75 | 92.5 |
| CAT (12 × 30) | CB/NI- SURFACE MODIFIED HIGH REACTIVITY | 0.5 | 7.3 | 3.64 | 71.4 |
| | | 1.0 | <3 | >2.25 | >88.2 |
| | | 5.0 | <3 | >0.45 | >88.2 |
| FILTRASORB 400 12 × 30 | CB/NI | 5.0 | 7 | 0.32 | 69.6 |
| | | 5.0 | 3 | 0.40 | 87.0 |
| HGR 4 × 8 | CB/15% SULFUR | 5.0 | 15 | 0.16 | 34.8 |

TABLE I-continued

INITIAL ISOTHERM TEST RESULTS FOR REMOVAL OF MERCURY FROM LIQUID HYDROCARBON

| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
|---|---|---|---|---|---|
|  |  | 5.0 | 16 | 0.14 | 30.4 |
| FCB 12 × 30 | CB/7% CuO | 5.0 | 15 | 0.16 | 34.8 |
|  |  | 5.0 | 17 | 0.12 | 26.1 |
| FCA 12 × 30 | CB/7% CuO + 2% $CrO^3$ | 5.0 | 9 | 0.28 | 60.9 |
|  |  | 5.0 | 10 | 0.26 | 56.5 |
| ASC (12 × 30) | CB/7% CuO + 2% $CrO^3$ + .05% SILVER | 5.0 | 6 | 0.34 | 73.9 |
|  |  | 5.0 | 15 | 0.16 | 65.2 |

*Minimum Mercury detection limit = 3 ug/kg
CB = Coal based activated carbon
CNB = Coconut based activated carbon
NI = Non-impregnated Impregnated Carbon Test Preparations and Procedures In the preparation process, the activated carbons tested were first pulverized and oven dried. Carbon dosages in the procedure ranged from 0.0003 to 5 grams per 100 grams of C5–C7 industrial grade natural gas condensate. The carbon/hydrocarbon mixture was placed in an air tight vessel with no head space and allowed to equilibrate with stirring for 24 hours. The carbon was removed from the samples by filtration prior to analysis for residual mercury concentration. The test samples were analyzed by hydrobromic acid extraction followed by ICP/Mass Spectrometry quantifying the two major mercury isotopes.

Mercury liberation tests subsequently performed on liquid hydrocarbon indicated the liberation of elemental mercury vapor upon addition of aqueous stannous chloride. Mercury vapor was not liberated from the liquid hydrocarbon in the absence of reducing agent stannous chloride. As a result of these tests, it was determined that the mercury content of the liquid hydrocarbon was most likely not in an elemental state. It was discovered that the presence of stannous chloride acted as a reducing agent and potassium iodide acted as a reactant, thereby significantly enhancing adsorption of mercury on activated carbon by converting what appears to be organic-bound mercury into a more readily adsorbable form of mercury. The stannous cation reduces the mercury to its elemental state, whereas the potassium iodide reacts so as to form a mercury halide salt.

The concept of converting organic mercury to a more adsorbable form was first tested with equilibrium isotherm studies using a 1% Ag impregnated coal based carbon (BPL), and a non-impregnated coal based carbon (CWS) to which an aqueous $SnCl_2$ solution was added. A 2% KI impregnated pelleted wood based carbon was included to evaluate the halogen reaction concept. Table II sets forth the results of these studies and demonstrates the fundamental effectiveness of the impregnated carbons in reducing concentrations of mercury. These tests dramatically demonstrate the potential of certain carbon formulation concepts and the particularly remarkable results that these concepts (such as with the wood based pellet carbon impregnated with 2% KI) were capable of attaining.

It is important to note that in all Tables describing all isotherm and column tests, the minimum reliable mercury detection limit was determined to be 3 ug/kg; as such, due to the analytical limitations of the method used to evaluate the amount of residual mercury present, the Tables use "<3 ug/kg" as the lowest residual mercury figure. In the case of the impregnated carbons of the present invention, readings well below the reliable detection limit of 3 ug/kg were often obtained, indicating that even more efficient mercury removal may actually be obtained by practicing the present invention than indicated in the Tables by the minimum reliable figure. Further, the base figure of <3 ug/kg artificially holds the mercury removal percentages below the levels they would otherwise be if a more accurate residual mercury measurement were possible.

TABLE II

ISOTHERM TEST RESULTS FOR REMOVAL OF MERCURY FROM LIQUID HYDROCARBON

| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
|---|---|---|---|---|---|
| BPL 12 × 30 | CB/1% SILVER- + **AQ. $SnCl_2$ | 0.1 | <3 | >22.5 | >88.2 |
|  |  | 0.5 | <3 | >4.5 | >88.2 |
|  |  | 1.0 | <3 | >2.25 | >88.2 |
|  |  | 5.0 | <3 | >0.45 | >88.2 |
| CWS 12 × 30 | CB/NI + **AQ. $SnCl_2$ | 0.1 | <3 | >22.5 | >88.2 |
|  |  | 0.5 | <3 | >4.5 | >88.2 |
|  |  | 1.0 | <3 | >2.25 | >88.2 |
|  |  | 5.0 | <3 | >0.45 | >88.2 |
| 4 mm PELLET | WB/2% KI | 0.5 | <3 | >4.5 | >88.2 |
|  |  | 1.0 | <3 | >2.25 | >88.2 |
|  |  | 5.0 | <3 | >0.45 | >88.2 |

*Minimum Mercury detection limit = 3 ug/kg
**10% Aqueous $SnCl_2$ solution added to hydrocarbon-carbon slurry
CB = Coal based activated carbon
CNB = Coconut based activated carbon
WB = wood based activated carbon
NI = Non-impregnated Follow-up studies were conducted using impregnations of coal based activated carbons with 2% $Sn^{+2}$ as SnCl$_2$, and coal based activated carbon with 2% Ag+2% Sn$^{+2}$ as SnCl$_2$. A wood based 2% KI impregnated activated carbon, a high activity coconut carbon impregnated with 2% KI (GRC-11); a control sample of the non-impregnated coal based carbon (CWS) was also included in the study. Due to the expected enhanced capability of these impregnated carbons for mercury removal, carbon dosages were lowered significantly to provide data distinguishing each carbon's level of performance. The results of these studies demonstrates the effectiveness of impregnated carbons in reducing high- as well as low-level concentrations of mercury. Table III sets forth the results of these selected carbon isotherm test. The impregnated carbons tested in this initial phase clearly demonstrate greatly enhanced mercury removal performance over the performance characteristics of the non-impregnated base carbons.

attained with the present invention composition containing either metal halides. Theoretically, Sn$^{+2}$, Sn$^{+3}$, Ti$^{+2}$, Ti$^{+3}$, and Cu have the requisite structure to act as reactant/reducing agents. The Table I and II compositions show that these impregnated carbons perform extremely well in removing even trace levels of mercury from a liquid hydrocarbon media. Good performance is also attained in all critical areas with the present invention using specialized compositions containing Ag, Sn, Zn, Al, Au, Cu and alkali elements. Other agents may also be added, depending on the desired performance characteristics; The compositions used can be tailored to meet specific desired performance characteristics for any number of industrial or other needs.

The second phase of carbon isotherm testing included evaluation of alternative metal halide impregnants in facilitating mercury removal from liquid hydrocarbon.

TABLE III

| | PHASE I ISOTHERM TEST RESULTS FOR REMOVAL OF MERCURY FROM LIQUID HYDROCARBON | | | | |
|---|---|---|---|---|---|
| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
| 4 mm PELLET | WB/2% KI | 0.003 | 9.1 | 1029.4 | 76.1 |
| | | 0.01 | <3 | >350.0 | >92.1 |
| | | 0.1 | <3 | >35.0 | >92.1 |
| | | 0.56 | <3 | >6.25 | >92.1 |
| 10 GRC-11 12 × 30 | CNB/2% KI | 0.0014 | 16.1 | 228.6 | 10.6 |
| | | 0.003 | 15.1 | 142.2 | 16.1 |
| | | 0.011 | 16.9 | 21.0 | 6.1 |
| | | 0.11 | 3.1 | 14.5 | 82.8 |
| CWS 12 × 30 | CB/2% SnCl$_2$ | 0.003 | 38.0 | 0 | 0 |
| | | 0.01 | 22.0 | 142.7 | 42.1 |
| | | 0.1 | <3 | >35.0 | >92.1 |
| CWS 12 × 30 | CB/2% SnCl$_2$ + 2% SILVER | 0.003 | 35.0 | 102.8 | 7.9 |
| | | 0.01 | 16.0 | 189.6 | 57.9 |
| | | 0.1 | <3 | >35.0 | >92.1 |
| CWS 12 × 30 | CB/NI | 0.003 | 38.0 | 0 | 0 |
| | | 0.01 | 37.0 | 8.9 | 2.6 |
| | | 0.1 | 30.0 | 7.1 | 21.1 |
| | | 0.56 | 6.6 | 5.6 | 82.6 |

*Minimum Mercury detection limit = 3 ug/kg
CB = Coal based activated carbon
CNB = Coconut based activated carbon
WB = Wood based activated carbon
NI = Non-impregnated Both the Table II and Table III preliminary tests both illustrate the superior performance of these impregnated carbons for mercury removal over the carbons as tested in Table I. The Table II and III tests results establish the effectiveness of reactant/reducing agent impregnated carbons in removing mercury from liquid hydrocarbon. The Table II and III studies also show that well-balanced performance in all critical areas is attained with the present invention composition containing Metal halide impregnated carbons were prepared in the laboratory including KCl, KBr, CaCl$_2$, CuCl$_2$, FeCl$_3$, and ZnCl$_2$ on 1 mm wood based pellets. The data set forth in Table IV clearly indicates the chloride, iodide, and bromide halides in conjunction with a wide variety of metals also exhibit enhanced mercury removal capacity compared to the materials in Table I.

TABLE IV

| | PHASE II ISOTHERM TEST RESULTS FOR REMOVAL OF MERCURY FROM LIQUID HYDROCARBON | | | | |
|---|---|---|---|---|---|
| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
| 4 mm PELLET | WB/2% KI | 0.0013 | 4 | 1049.5 | 77.7 |
| | | 0.0044 | 4 | 317.8 | 77.7 |
| | | 0.106 | <3 | >14.1 | >83.3 |
| 1 mm PELLET | WB/2% KI | 0.0014 | <3 | >1071.4 | >83.3 |
| | | 0.0043 | 4 | 324.3 | 77.7 |
| | | 0.105 | <3 | >14.3 | >83.3 |
| 1 m PELLET | WB/2% KCl | 0.0015 | 4 | 956.6 | 77.7 |
| | | 0.0043 | 3 | 349.5 | 83.3 |
| | | 0.107 | 5 | 12.1 | 72.2 |
| 1 mm PELLET | WB/2% KBr | 0.0013 | 3 | 1126.6 | 83.3 |
| | | 0.0043 | 4 | 328.3 | 77.7 |
| | | 0.104 | 4 | 13.5 | 77.7 |
| 1 mm PELLET | WB/2% CaCl$_2$ | 0.0016 | 6 | 770.8 | 66.7 |
| | | 0.054 | 9 | 16.6 | 50.0 |
| 1 mm PELLET | WB/2% CuCl$_2$ | 0.0014 | 8 | 711.5 | 55.5 |
| | | 0.052 | 5 | 25.2 | 72.2 |

TABLE IV-continued

PHASE II ISOTHERM TEST RESULTS FOR REMOVAL OF MERCURY FROM LIQUID HYDROCARBON

| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
|---|---|---|---|---|---|
| 1 mm PELLET | WB/2% $ZnCl_2$ | 0.0015 | 9 | 592.5 | 50.0 |
|  |  | 0.052 | 10 | 15.3 | 44.4 |
| 1 mm PELLET | WB/2% $FeCl_3$ | 0.053 | 10 | 15.2 | 44.4 |

*Minimum Mercury detection limit = 3 ug/kg
CB = Coal based activated carbon
CNB = Coconut based activated carbon
WB = Wood based activated carbon
NI = Non-impregnated A third phase of isotherm testing was performed on laboratory prepared impregnated carbons to evaluate the effects on mercury removal capacity versus impregnant loading. The 1 mm pelleted wood based activated carbon was impregnated to contain levels ranging from 2 wt. % to 25 wt % KI. Similar impregnations were prepared using $SnCl_2$ and silver. The test results set forth in Table V indicate excellent mercury removal performance at all impregnant loadings tested. The combination of excellent carbon capacity and low mercury content of the hydrocarbons makes it extremely difficult to evaluate impregnant loading mercury capacity relationships.

TABLE V

ISOTHERM TEST RESULTS FOR REMOVAL OF MERCURY FROM LIQUID HYDROCARBON

| CARBON I.D. | CLASSIFICATION/ IMPREGNANT | CARBON DOSE (wt %) | *RESIDUAL Hg CONC. (ug/kg) | Hg LOADING (ug/g) | % Hg REMOVAL |
|---|---|---|---|---|---|
| 1 mm PELLET | WB/2% KI LP | 0.0015 | 16.4 | 187.7 | 8.9 |
|  |  | 0.003 | 15.7 | 123.3 | 12.8 |
|  |  | 0.01 | 9.4 | 88.8 | 47.8 |
|  |  | 0.1 | 3.0 | 15.0 | 83.3 |
| 1 mm PELLET | WB/4% KI LP | 0.0015 | 12.9 | 405.7 | 28.3 |
|  |  | 0.003 | 10.8 | 287.8 | 40.0 |
|  |  | 0.01 | 4.3 | 129.5 | 76.1 |
|  |  | 0.1 | <3 | >15.0 | >83.3 |
| 1 mm PELLET | WB/8% KI LP | 0.0015 | 8.0 | 751.5 | 55.6 |
|  |  | 0.003 | 10.4 | 290.1 | 42.2 |
|  |  | 0.01 | 8.7 | 93.9 | 51.7 |
|  |  | 0.1 | <3 | >15.0 | >83.3 |
| 1 mm PELLET | WB/12% KI LP | 0.0015 | 7.7 | 821.3 | 57.2 |
|  |  | 0.003 | <3 | >500.0 | >83.3 |
|  |  | 0.01 | 3.3 | 139.4 | 81.7 |
|  |  | 0.1 | <3 | >15.0 | >83.3 |
| 1 mm PELLET | WB/18% KI LP | 0.0013 | 5 | 967.3 | 72.2 |
|  |  | 0.0045 | 6 | 259.0 | 66.6 |
|  |  | 0.1 | <3 | >15.0 | >83.3 |
| 1 mm PELLET | WB/25% KI LP | 0.0013 | 6 | 924.7 | 66.7 |
|  |  | 0.0045 | 7 | 262.4 | 61.1 |
|  |  | 0.1 | <3 | >15.0 | >83.3 |
| 1 mm PELLET | WB/0.5% $SnCl^{2+}$ 0.5% SILVER LP | 0.0013 | 8 | 706.7 | 55.6 |
|  |  | 0.0045 | 9 | 208.0 | 50.0 |
| 1 mm PELLET | WB/5% $SnCl^{2+}$ 10% SILVER LP | 0.0013 | 9 | 616.5 | 50.0 |
|  |  | 0.0045 | 12 | 120.2 | 33.3 |

*Minimum Mercury detection limit = 3 ug/kg
CB = Coal based activated carbon
CNB = Coconut based activated carbon
WB = Wood based activated carbon
NI = Non-impregnated
LP = Carbon prepared in laboratory

Column Tests

Column testing of impregnated carbons was also conducted so as to evaluate mercury removal performance in a column treatment system. Column beds containing non-impregnated and 2% KI impregnated activated carbon pellets were used to treat an industrial hydrocarbon containing 38 ug/kg mercury. The tests were conducted under identical operating conditions, allowing a 30 minute contact time. The test results set forth in Table VI clearly show the mercury removal advantage attained with the impregnated product over the non-impregnated base carbon.

TABLE VI

MERCURY REMOVAL PERFORMANCE COLUMN TEST RESULTS NON-IMPREGNATED VS. IMPREGNATED

| Run Time (Mins) | Volume Treated (Gals.) | Carbon Use Rate (Lbs/1000 Gals) | Effluent Hg Conc. (ug/kg) | % Mercury Removal |
|---|---|---|---|---|
| Non-Impregnated 4 mm Pellets: Column Effluent Data ||||| 
| 60 | 0.008 | 19108 | 4.6 | 87.9 |
| 175 | 0.23 | 665 | 11.0 | 71.1 |
| 325 | 0.43 | 356 | 13.0 | 65.8 |
| 2% KI Impregnated 4 mm Pellets: Column Effluent Data ||||| 
| 60 | 0.008 | 19108 | <3 | >92.1 |
| 175 | 0.23 | 665 | <3 | >92.1 |
| 325 | 0.43 | 356 | <3 | >92.1 |

Column Conditions:
5 cc/min Flow Rate
1 Ft. Bed Depth
Ambient Temperature and Pressure An additional column study was conducted on a 1 mm wood based pellet impregnated to contain 2% KI.

The study was designed to define the bed depth required to achieve mercury removal to below detectable limits when treating liquid hydrocarbon at an arbitrarily selected 4 GPM/Sq. Ft. loading rate. The segmented column design allowed the extraction of treated hydrocarbon at various bed depths during the treatment process. An industrial grade liquid hydrocarbon containing 18 ug/kg mercury was used in the laboratory study. The data set forth in Table VII indicates a 50% reduction in mercury concentration is achieved within the first 12 inches of the carbon column. Complete removal of mercury to below the minimum mercury detection limit of 3 ug/kg is demonstrated within 6.75 ft. of the carbon bed.

TABLE VII

COLUMN TEST RESULTS USING PELLETS CONTAINING 2% KI. TREATING INDUSTRIAL GRADE NAPHTHA AT 4 GPM/Sq. Ft.

| Run Time (Mins) | Volume Treated (Gals.) | Carbon Use Rate (Lbs/1000 Gals) | Effluent Hg Conc. (ug/kg) | % Mercury Removal |
|---|---|---|---|---|
| 1 ft. Column Effluent Data (Influent Hg = 18 ug/kg): | | | | |
| 65 | 1.54 | 103.3 | 9.1 | 49.4 |
| 545 | 12.96 | 12.3 | 9.3 | 48.3 |
| 2.75 ft. Column Effluent Data: | | | | |
| 246 | 5.85 | 74.8 | 8.3 | 42.7 |
| 366 | 8.7 | 50.3 | 7.1 | 60.6 |
| 426 | 10.1 | 43.2 | 5.9 | 67.2 |
| 486 | 11.6 | 37.8 | 7.1 | 60.6 |
| 4.5 Column Effluent Data: | | | | |
| 367 | 8.7 | 82.0 | 5.2 | 71.1 |
| 427 | 10.2 | 70.5 | 4.5 | 75.0 |
| 487 | 11.6 | 61.8 | 4.9 | 72.8 |
| 547 | 13.0 | 55.1 | 5.1 | 71.7 |
| 577 | 13.7 | 52.3 | <3 | >83.3 |
| 6.75 ft. Column Effluent Data: | | | | |
| 548 | 13.0 | 82.6 | <3 | >83.3 |

Isotherm and Column Test Conclusions

The precise reaction that occurs to create the observed effectiveness of the impregnated carbons as tested is not readily apparent. Determining the actual identification and concentrations of the various mercury compounds present would be extremely difficult due to the varying characteristics and very low concentrations of individual components that may or may not be present in a particular sample. Based on well known organo-mercury chemistry, the organo-mercury compounds may be present in a variety of forms to include mercaptides with or without halides, dialkylmercury compounds, and organo-mercury salt compounds.

The reactions of each type of organic mercury compound is consistent with the probable removal mechanism whereby metal halides or reducing agents as impregnants convert mercury to an inorganic mercury halide salt or to elemental mercury during the removal process.

The essential ingredient in the impregnant metal halides in the present invention for facilitating mercury conversion and removal are the I, Br and Cl halides. As such, in addition to the representative metals tested the Tables above, any metal from the periodic table of the elements can serve as the "vehicle" for the depositing and/or maintaining the I, Br and Cl halides on the carbon surface.

Further, the percentage of reactant metal halide by weight of carbon adsorbent is not critical; when the metal halide comprises as little as 0.5% metal halide the positive effects of the present invention will result. As much as 25% or more metal halide by weight of carbon adsorbent may be desired, depending on the desired performance characteristics of the of said impregnated carbon adsorbent.

Similarly, when a $Sn^{+2}$, $Ti^{+2}$ and/or Cu reducing agent is used to reduce organic mercury to its elemental state, depending on the application to be made, from about 0.5% to 25% reducing agent by weight of carbon adsorbent may be desired. When an Ag, Sn, Zn, Al, Au, Cu and/or alkali element amalgamating agent is additionally impregnated on the carbon adsorbent, the amalgamating agent may usefully comprise from about 0.5% to 15% of amalgamating agent by weight of impregnated carbon adsorbent.

In short, the isotherm and column tests conducted using the carbons of the present invention yielded outstanding mercury adsorptive results that had previously been thought impossible to obtain.

Carbon Impregnant Leach Testing

Leach tests were run to determine if any of the impregnants used resulted in undesirable leaching of the impregnants. The data set forth in Tables VIII and IX indicates that significant levels of the impregnants and ash constituents do not leach from the carbon during treatment in either a column or in equilibrium (batch) form.

Batch equilibrium leach studies were conducted similar to the isotherm adsorption studies. Pulverized 10 g doses of non-impregnated base and the 2% KI impregnated pellet carbons were contacted with approximately 150 g of hydrocarbon and allowed to equilibrate with mixing for 36 hours. The liquor was then pressure filtered through 0.45 μm nylon pads for removal of carbon and submitted for analysis. A blank, untreated aliquot of the hydrocarbon was also filtered and submitted.

The column leach studies were performed with the 4 mm nonimpregnated and impregnated carbons loaded into 1" diameter columns to 1 foot bed depths (approximately 67 g). Liquid hydrocarbon was introduced upflow into the dry carbon bed simulating the worst case scenario for impregnant leaching, that being the initial wet down/degassing process. The first bed volume of treated liquor was collected, filtered through 0.45 μm nylon pads for removal of fines, and submitted for analysis. A 5 cc/min flow rate was used allowing for a 30 minute EBCT. A significant increase in temperature was observed during the initial wet down process, which quickly dissipated as the liquid level progressed up the bed. Approximately 10 bed volumes of hydrocarbons (1500 cc) were treated with each carbon column prior to termination of the studies. Additional samples were collected after 1, 5 and 10 bed volumes for mercury analysis presented previously in Table VI.

The data set forth in Table VIII indicates that significant levels of the impregnants and ash constituents do not leach from the carbon during treatment. The 43.6 ug/kg potassium concentration found in the impregnated carbon treated liquor represents 0.0015% of the total potassium available on the carbon surface and is only twice the concentration of potassium in the original untreated hydrocarbon.

TABLE VIII

PRELIMINARY IMPREGNANT/ASH LEACH TEST RESULTS

| CARBON I.D. | CLASSIFICATION/ IMPREGNANT | K (ppb) | I (ppb) | Al (ppb) | Cu (ppb) | Fe (ppb) | Mg (ppb) | Si (ppb) |
|---|---|---|---|---|---|---|---|---|
| | BATCH EQUILIBRIUM TESTS* | | | | | | | |
| CONTROL | UNTREATED | 21 | <100 | <10 | 3 | 13 | 150 | 40 |
| 4 mm PELLET | WB/NI | 24.5 | 200 | <10 | <1 | 6 | 113 | <10 |
| 4 mm PELLET | WB/2% KI | <1 | <100 | <10 | <1 | <2 | <1 | <10 |
| | COLUMN TESTS** | | | | | | | |
| 4 mm PELLET | WB/NI | 3.5 | <100 | <10 | 2 | 14.9 | 13 | <10 |
| 4 mm PELLET | WB/2% KI | 43.6 | 100 | 500 | <1 | 156 | 64 | 13 |

*6 grams carbon/100 grams of hydrocarbon. Equilibrated for 36 hours, followed by pressure filtration.
**30 Min. EBCT. Sample represents initial column effluent liquor.
WB = Wood based activated carbon.
NI = Nonimpregnated
WI = Potassium Iodide The previously discussed mercury removal performance testing also provided valuable tools for the evaluation of impregnant leachability during normal treatment processes. The additional leach tests conducted also suggest that the impregnants do not leach from the activated carbon upon exposure to liquid hydrocarbon. The data set forth in Table IX indicates an actual reduction in potassium and iron upon treatment and the iodide level remained below the analytical detection limits.

TABLE IX

COLUMN TEST RESULTS USING 1 mm PELLETS CONTAINING 2% KI TREATING INDUSTRIAL GRADE NAPHTHA AT 4 GPM/Sq.Ft. IMPREGNANT LEACH DATA

| Run Time (Mins) | Volume Treated (Gals.) | Carbon Use Rate (Lbs/1000 Gals) | I (ppm) | K (ppm) | Fe (ppm) |
|---|---|---|---|---|---|
| Influent | — | — | <.4 | 0.6 | 2.43 |
| 66 | 1.57 | 1332.8 | <.4 | 0.12 | 0.08 |
| 246 | 5.85 | 357.7 | <.2 | 0.03 | 0.49 |
| 546 | 12.98 | 161.2 | <.05 | 0.12 | 0.98 |

Notes:
EBCT = 23 Mins
Ambient temperature and pressure

In short, the impregnated carbons of the present invention do not appear to result in undesired leeching of the impregnants.

What is claimed:

1. A process for removing mercury from liquid hydrocarbon comprising contacting said liquid hydrocarbon with an adsorbent comprising an activated carbon impregnated with a reactant metal halide wherein said metal is selected from the group consisting of the metals from Group Ia and Group II of the periodic table of elements and said halide is selected from the group consisting of I, Br and Cl, said metal halide comprising from about 0.5% to 25% by weight of said impregnated carbon adsorbent.

2. A process for removing mercury from liquid hydrocarbon as set forth in claim 1, wherein said metal in the reactant metal halide is comprised of a metal selected frown the group consisting of K, Ca, Fe and Zn.

3. A process of removing mercury from liquid hydrocarbon comprising contacting said liquid hydrocarbon with a carbon adsorbent having a reducing agent impregnated on said carbon adsorbent to reduce any mercury present in said liquid hydrocarbon, to an elemental state and thereafter reacting with an amalgamating agent, said reducing agent being an ion selected from the group consisting of $Sn^{+2}$ and $Ti^{+2}$ and comprising from about 0.5% to 25% by weight of said impregnated carbon adsorbent.

4. A process for removing mercury from liquid hydrocarbon as set forth in claim 3, wherein said amalgamating agent is selected from the group consisting of Ag, Zn, Al, Au and alkali elements from the periodic table of elements, said amalgamating agent comprising from about 0.5% to 25% by weight of said impregnated carbon adsorbent.

5. A method of treating liquid hydrocarbon for removing any mercury in the liquid hydrocarbon comprising contacting the liquid hydrocarbon with an impregnated carbon adsorbent, said carbon adsorbent being impregnated with a reactant metal halide wherein said metal is selected from the group consisting of Group Ia and Group II of the periodic table of elements and said halide being selected from the group consisting of I, Br and Cl, said metal halide comprising from about 0.5% to 25% by weight of said impregnated carbon adsorbent.

6. A method of treating liquid hydrocarbon comprising converting mercury present in the hydrocarbon to an elemental state by reacting the liquid hydrocarbon with a reducing agent and removing said element mercury by contacting the liquid hydrocarbon with an amalgamating agent impregnated on a carbon adsorbent, said reducing agent being an ion selected from the group consisting of $Sn^{+2}$ and $Ti^{+2}$, said reducing agent comprising from about 0.5% to 25% by weight of said impregnated carbon adsorbent.

7. A method of treating liquid hydrocarbon as set forth in claim 6 wherein said amalgamating agent is selected from the group consisting of Ag, Zn, Al, Au and alkali elements from the periodic table of elements, said amalgamating agent comprising from about 0.5% to 25% by weight of said impregnated carbon adsorbent.

* * * * *